Feb. 26, 1946.        J. B. WEBB ET AL        2,395,599
MULTIPLE DRIVE CONVEYER AND THE LIKE
Filed Jan. 11, 1943        3 Sheets-Sheet 1

INVENTORS
Jervis B. Webb
Andrew G. Rose
BY Joseph Harley
ATTORNEY.

Feb. 26, 1946. J. B. WEBB ET AL 2,395,599
MULTIPLE DRIVE CONVEYER AND THE LIKE
Filed Jan. 11, 1943 3 Sheets-Sheet 2

INVENTORS
Jervis B. Webb
Andrew G. Rose
BY Joseph Varley
ATTORNEY.

Feb. 26, 1946.  J. B. WEBB ET AL  2,395,599
MULTIPLE DRIVE CONVEYER AND THE LIKE
Filed Jan. 11, 1943  3 Sheets-Sheet 3
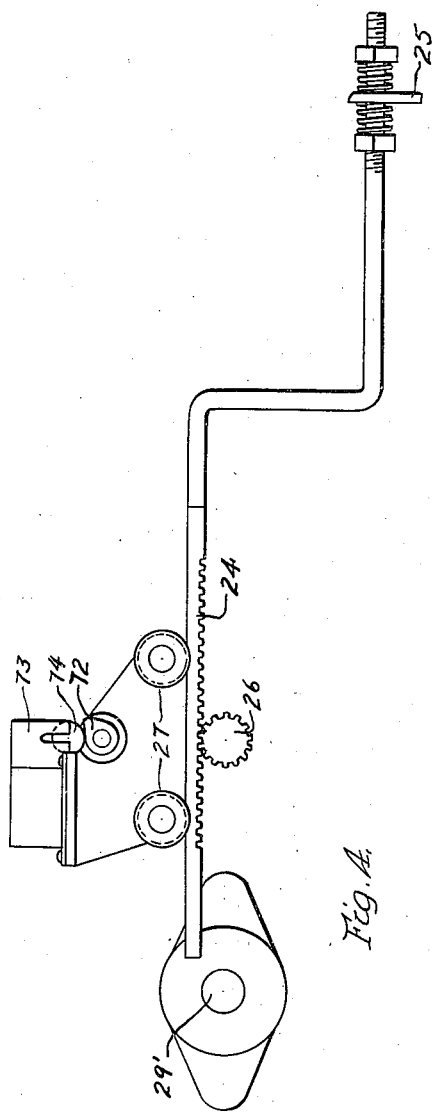
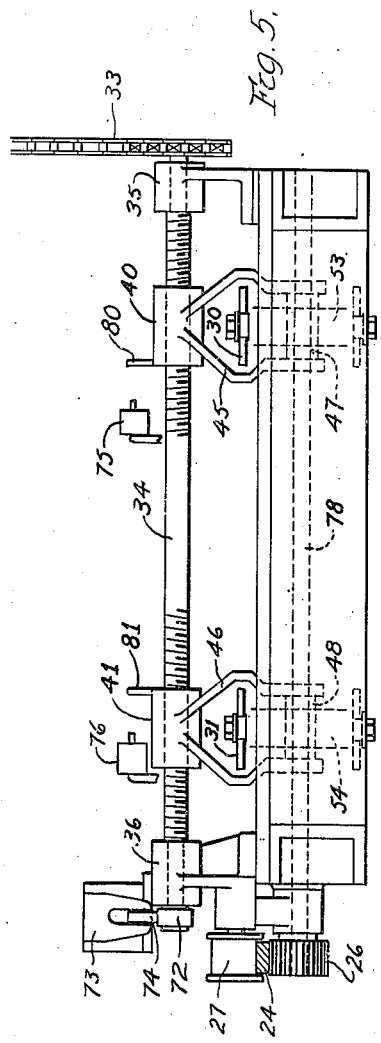
INVENTORS
Jervis B. Webb
Andrew E. Rose
BY Joseph Darley Patented Feb. 26, 1946

2,395,599

UNITED STATES PATENT OFFICE 2,395,599

MULTIPLE DRIVE CONVEYER AND THE LIKE

Jervis B. Webb, Bloomfield Hills, and Andrew G. Rose, Detroit, Mich., assignors to Jervis B. Webb Company, Detroit, Mich., a corporation of Michigan Application January 11, 1943, Serial No. 471,974

2 Claims. (Cl. 198—203)

This invention relates to a speed control device for conveyer drives and is especially suited for use in all conveyer installations where the length of the conveyer is such that more than one driving unit is required for satisfactory operation.

The problem of speed control of multiple drive conveyers has two principal factors, first, to synchronize the speed of all drives according to the rate of travel desired of the conveyer, and second, to provide for independent speed control of each drive to compensate for occasional load variations which occur as the result of a number of causes. A satisfactory means of accounting for this second factor has previously been disclosed and described in Letters Patent No. 1,847,152 issued March 1, 1932, to Jervis B. Webb et al., which means may be incorporated in the structure of the present invention.

In a large majority of installations it is necessary to regulate the rate of travel of the conveyer in accordance with production speed, which in some cases may vary several times daily. When multiple drives are used, it is obvious that each time the speed is changed, all auxiliary drives must be perfectly synchronized to the new speed of the master drive. With the present designs of driving units, the means provided for speed regulation require a manual operation upon each separate drive. In other words, in the process of changing speed and synchronizing each of the drives, a man must be stationed to operate the speed control means of each driving unit until the proper adjustment is precisely obtained, which process may take considerable time.

It is this lengthy, inefficient process of speed control which this invention aims to eliminate, by providing automatic speed changing in which the synchronism of the drive as a whole is maintained throughout the speed range.

Another purpose is to accomplish a simultaneous speed change in all driving units by the operation of a central control, and further to regulate the amount of either increase or decrease in speed as desired, merely by operation of this same central control.

A further object of this invention is to combine a device designed to accomplish the objects above set forth with the equalizing drive for conveyer systems set forth in United States Patent No. 1,847,152, to the end that automatic control over all types of speed variation will be achieved.

Incidental objects and advantages will be recognized after a consideration of the following description of the invention and the drawings forming a part hereof, wherein Fig. 1 is a plan view of a conveyer driving unit in which the invention is incorporated;

Fig. 4 is a side elevation in diagrammatic form of various elements of the speed control mechanism, showing an alternate construction.

Fig. 5 is an end view of a portion of the drive unit, also in diagrammatic form, further illustrating the alternate construction of Fig. 4.

Figure 1:
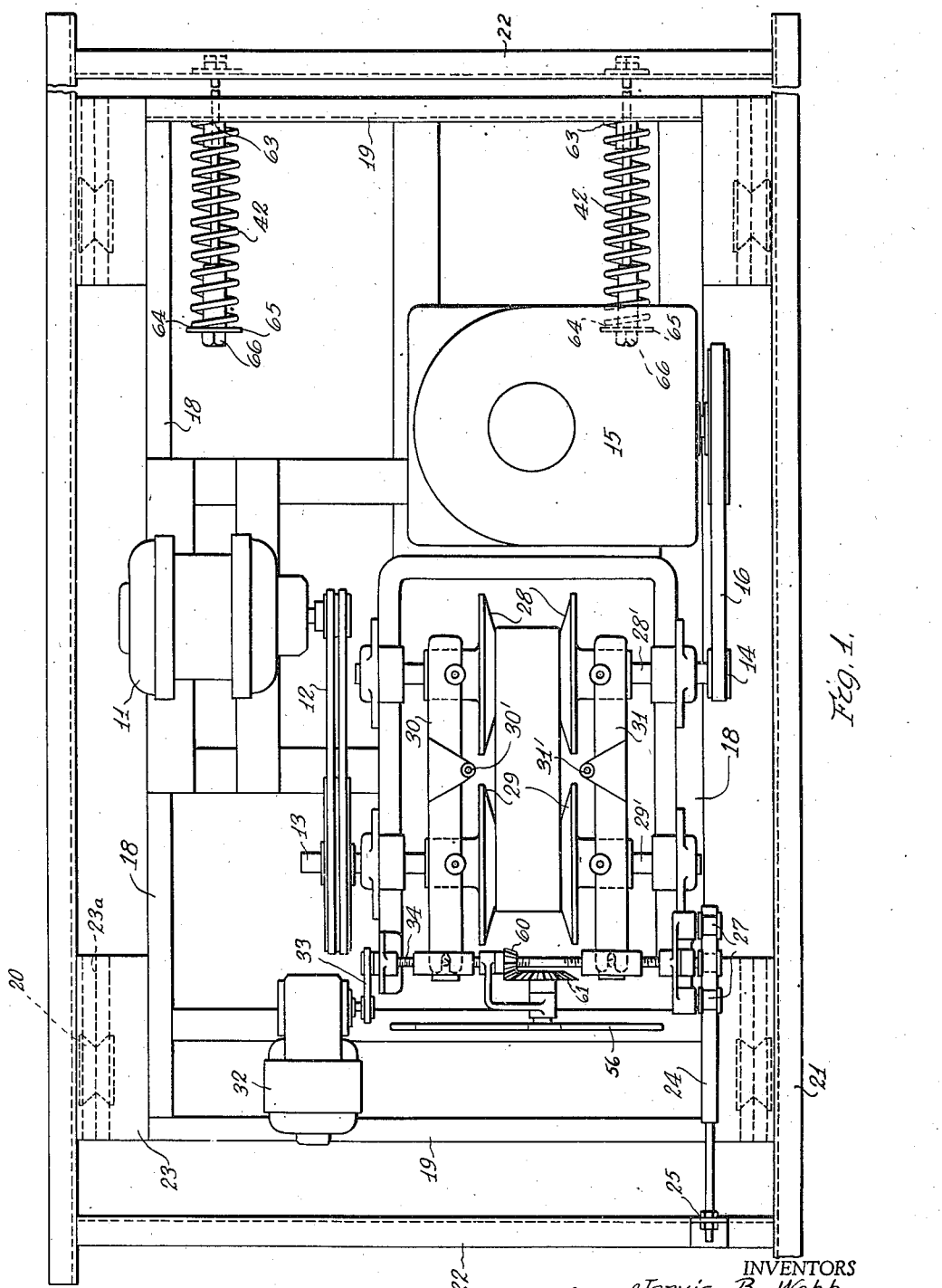
Figure 3:
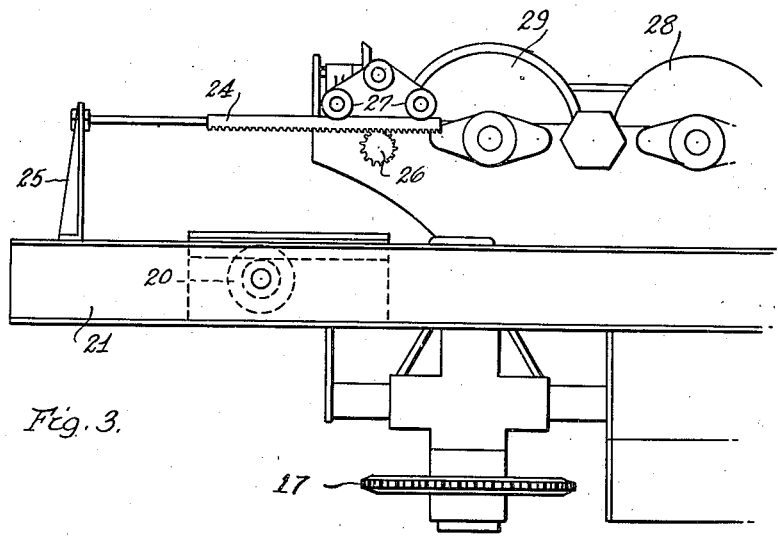
Fig. 3 is a side elevation of that portion of the structure of Fig. 1 as is shown in approximately the lower half thereof.

The unit shown in the drawings is for the purpose of controlling the drive of a caterpillar type unit. The caterpillar chain which this unit drives is standard conveyer equipment and is not shown in the drawings, and for the purpose of this description, it is sufficient to mention that the caterpillar chain is in general design like that shown in Fig. 5 of our Patent 1,847,152 in that it employs an endless chain with projecting lugs carried around two sprockets, one of which is driven and the other of which is an idler sprocket. The idler sprocket is shown in Fig. 3 of the drawings of this application and the driven sprocket is directly under the gear box 15 of Fig. 1 but is not shown in the drawings. Referring to Fig. 1 power is supplied to the input shaft 13 of a Reeves transmission by a driving motor 11 acting through a belt 12. The output shaft 14 of this transmission, through a belt 16, drives a gear box 15 in which the motion is imparted to the driving sprocket of the caterpillar (not shown), this sprocket being similar to the idler sprocket 17 shown in Fig. 3.

All this driving mechanism, as well as the speed control elements, is supported in a movable frame consisting of suitable longitudinal members 18 and transverse members 19, this frame being mounted as a unit upon grooved rollers 20 carried by side rails 21 of a stationary frame, the structure of which latter frame is completed by end members 22. The rollers 20 engage V-ways 23a formed on outboard brackets 23 which comprise a part of the movable frame structure, thereby preventing lateral motion of the movable frame during the longitudinal or horizontal displacement thereof.

This displaceable, or floating frame, is provided to control the speed of the drive and maintain the same uniform at the desired speed free from the influence of variations in conveyer load. An increase or decrease in conveyer load would produce a reaction upon the driving unit tending to slow it down or speed it up respectively, but by reason of the floating frame, movement of the drive unit in the direction of this reaction is utilized to produce a compensating change in speed, according to the teaching of the aforesaid United States Patent No. 1,847,152.

Figure 2:
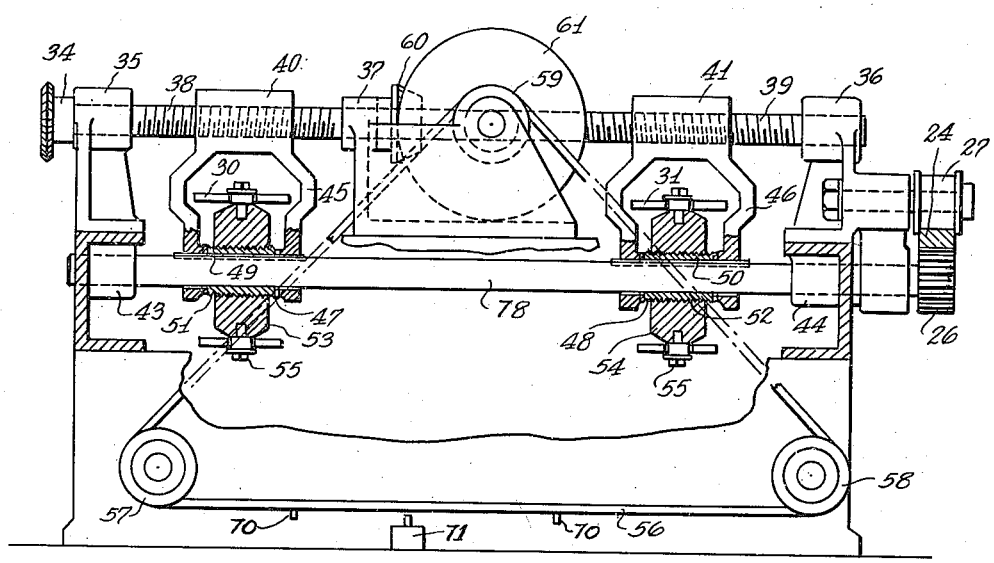
Fig. 2 is an end elevation of a portion of the structure of Fig. 1, showing particularly the details of the invention on an enlarged scale.

The means disclosed herein for producing compensating change in speed is a material departure from, and an improvement on, means shown in the aforementioned United States patent and forms the subject matter of the invention herein disclosed. Fig. 3 shows a rack 24 anchored to a bracket 25 attached to the stationary frame, and held in engagement with a gear 26 by guide rollers 27, so that any movement of the drive unit caused by the above mentioned reaction will produce a rotation of the gear 26. As shown in Fig. 2 this gear is connected to the speed control shaft 78 which extends transversely of the unit. By means of mechanism which will be later described, such rotation of the gear 26 is made to affect the Reeves transmission, causing an increase or decrease in driving speed according to the character and direction of the reaction upon the driving unit, or in other words, according to the nature of the change in conveyer load.

Springs 42 are provided to oppose the displacement of the movable frame by minor or inconsequential variations in conveyer load and to return the frame to normal operating position after a change in load has been counteracted. These springs are retained in position by being mounted about long bolts 62 which are secured to an end member 22 of the stationary frame and which extend freely through holes provided in the transverse member 19 of the movable frame. One end 63 of each spring abuts against the inner surface of the transverse member 19 of the movable frame while the opposite ends 64 bear against washers or back-up plates 65 which are in turn held in place by nuts 66 engaging the bolts 62. The amount of variation in load, which must occur before displacement of the movable frame will result, can be regulated first by the characteristics of the springs selected, and second, by placing such springs under different amounts of compression according to the position of the nuts 66.

The Reeves transmission consists of two pairs of cone faced pulleys 28 and 29, which may be moved axially upon their respective shafts 28' and 29' by movement of shifting levers 30 and 31. These shifting levers are mounted on pivots 30' and 31' so that a movement of the shifting levers such as would cause the pulleys 28 either to be brought together or drawn apart, would be accompanied by an opposite movement of the pulleys 29 causing them to be drawn apart or drawn together, as the case may be. In former constructions of driving units the shifting levers of the Reeves transmission were manually operated with the objectionable features as previously mentioned.

To overcome these objectionable features, the driving unit of the present invention is provided with an auxiliary motor 32 which is connected by a belt 33 so as to produce rotation in a shaft 34. This shaft 34 is mounted in end bearings 35 and 36 (see Fig. 2) and also in a central bearing 37. Between the end and central bearings the shaft 34 is provided with right and left hand threaded portions 38 and 39 respectively, and internally threaded collars 40 and 41 are mounted upon the shaft in engagement with each of such threaded portions. The shifting levers 30 and 31 are associated with the collars in a manner to be later described so that rotation of the shaft 34 will cause the collars 40 and 41 and the shifting levers 30 and 31 to be moved inwardly or outwardly upon the shaft, depending upon the direction of such rotation, and thereby produce a speed change in the Reeves transmission with the result that the speed of the driving unit may be varied by controlling the operation of the auxiliary motor 32.

As shown in Fig. 2 the aforementioned shaft 78 is mounted below the shaft 34 in bearings 43 and 44, and attached to one end of this shaft is the gear 26 operated by the rack mechanism previously described, so that rotation of the shaft 78 will accompany the movement of the drive unit caused by the reaction resulting from occasional fluctuations in load. In order that a compensating speed change in the Reeves transmission may accompany such occasional variations in load independently of over-all speed changes controlled by the auxiliary motor 32, the collars 40 and 41 are provided with depending yoke shaped portions 45 and 46 such that the shaft 78 extends through the lower parts of these yoke shaped portions. Sleeves 47 and 48 are mounted on the shaft 78 between the lower parts of the yoke shaped portions 45 and 46 of the collars 40 and 41. Those portions of the shaft 78 corresponding to the right and left hand threaded portions 38 and 39 of the shaft 34 are provided with splineways 49 and 50 such that the sleeves 47 and 48 may slide longitudinally of the shaft 78 but at the same time may also rotate with this shaft. The outer surfaces 51 and 52 of the sleeves 47 and 48 are provided with right and left hand threads corresponding to the right and left hand threaded portions 38 and 39 of the upper speed control shaft 34, and such threaded surfaces are engaged by correspondingly threaded members 53 and 54 to which the shifting levers 30 and 31 are secured as by bolts 55.

To explain the operation of this speed changing mechanism, if an over-all variation in driving speed is desired, the auxiliary motor 32 is started, thus producing rotation in the shaft 34 and causing the collars 40 and 41 to move along such shaft. During this motion the sleeves 47 and 48 will slide along the auxiliary speed control shaft 78 in the splineways 49 and 50 and the relation of the cone pulleys 28 and 29 in the Reeves transmission will be changed by the accompanying movement of the shifting levers 30 and 31. If an occasional load is placed upon the conveyer, such as will produce a reaction upon the driving unit sufficient to cause the same to move in the direction of this reaction as previously discussed, this movement will produce a rotation of the auxiliary speed control shaft 78, and upon such rotation of this shaft the sleeves 47 and 48 will also rotate. By reason of the threaded engagement between the members 53 and 54 and the sleeves 47 and 48, a rotation of the sleeves will produce a movement of these members 53 and 54 longitudinally of the shaft 78, thereby causing a speed change in the Reeves transmission. It will be noted that the extent of this speed change is limited by the clearance between the shifting levers 30 and 31 and the yoke shaped portions 45 and 46 of the collars 40 and 41, but since the amount of speed change required to compensate for occasional load fluctuation is not very great, a large amount of clearance is not required. In fact, it is customary practice to employ limit switches, connected in the circuit of the driving motor, so as to stop the operation of the drive upon the occurrence of an overload of such an extent as would produce undue strain on the unit.

As more than one driving unit of this type is ordinarily associated with the same conveyer line, it is desirable that speed changes in all driving units may be produced simultaneously and in synchronism, and to accomplish this some form of control device is provided to govern the operation of the auxiliary motor 32. Two types of control devices are illustrated in the drawings. The first, shown in Fig. 2, consists of a control belt 56 trained about a series of pulleys 57, 58 and 59. The belt is driven by means of a bevel gear 60 secured to the shaft 34, and meshing with another gear 61 which drives the upper pulley 59. Lugs 70, adapted to contact a limit switch or switches, 71, are attached to this control belt 56 at spaced intervals according to the type of control desired. For example, the lugs and limit switches may be arranged so that the auxiliary motor 32 will be automatically stopped after the upper speed control shaft 34 has rotated one turn. The auxiliary motors 32 of all driving units on a conveyer line may then be wired to a single push button control located at some central point so that thereby the speed of all drives operating on any conveyer line may be simultaneously changed in synchronism by merely pushing this control button the number of times corresponding to the number of turns of rotation required in the speed control shaft 34 to produce the speed change needed in the line.

The second form of control device, illustrated in Figs. 4 and 5, is somewhat simpler than the belt type just described as the control belt, together with its associated gears and pulleys, is replaced by a cam 72 attached to one end of the upper speed control shaft 34 so as to rotate therewith. A switch unit 73 is mounted upon the structure of the drive unit adjacent the cam 72 so that a follower 74, which is associated with the contacts of the switch unit, rests against the periphery of the cam 72. Thus it will be seen that with the type of structure illustrated, the contacts of the switch unit 73 will be actuated by the cam 72 each time the speed control shaft 34 completes a revolution so that by properly wiring the switch unit to the auxiliary motor, the operation of the same and hence the speed of the driving unit or units may be automatically regulated in the same manner as has been previously mentioned in connection with the description of the belt type of control device. While this cam type of control device is simpler and less costly than the belt type, the latter can offer certain advantages in flexibility since the nature of its controlling action may readily be varied by merely changing the position of the lugs 70 along the length of the belt 56.

Another feature in the automatic control of the auxiliary motor 32 is shown in Fig. 5. Since this invention makes it possible to control the speed of the drive from some remote point, so that the operator would not know the exact position of the shifting levers 30 and 31, it would be possible to actuate the speed control mechanism to the limit of either an increasing or decreasing speed change, at either of which points further actuation would result in damage to the speed control mechanism, if not to the drive unit as a whole. To prevent this, a pair of normally closed limit switches 75 and 76 are suitably mounted so as to be actuated by lugs 80 and 81 which are associated with the collars 40 and 41 respectively. These switches 75 and 76 are wired in the circuit of the auxiliary motor 32 so that the motor is stopped and reversed when either the switch 75 is actuated by the lug 80 or the switch 76 is actuated by the lug 81. In other words, the switch 75 acts to prevent a decrease in speed beyond the capacity of the unit, while the switch 76 similarly confines increases in speed.

It can thus be seen that the speed governing mechanism of the present invention makes it possible to have complete automatic control of the speed of multiple drive conveyers whether a speed change is required to compensate for an increased or decreased rate of production or merely to compensate for load variations while maintaining a constant rate of conveyer travel.

As the combination of lugs and limit switches mentioned above is a commonly used method of controlling the operation of machinery, details and wiring diagrams of the lugs and limit switches used with the present invention are not fully included in the drawings. Moreover, it is recognized and intended that these details will vary to suit the requirements of particular installations.

Other variations and modifications of the structure described and disclosed herein may be made without departing from the spirit and scope of this invention, as set forth in the following claims:

We claim:

1. In a driving unit for an endless conveyer chain having a stationary frame, a movable frame and driving means including a variable speed transmission carried by said movable frame, means to automatically control the normal operating speed of said driving unit and to correct said driving speed according to the load imposed upon said driving unit by said conveyer chain, said means comprising shifting levers connected to said transmission, an auxiliary motor associated with said driving unit, a control shaft driving by said auxiliary motor, a second control shaft mounted adjacent said first control shaft, gearing interposed between said frames and associated with said second control shaft, members connecting said shifting levers with each of said control shafts whereby a change in the operating ratio of said transmission may be effected by the actuation of either or both of said control shafts, said first mentioned control shaft governing the normal operating speed of said driving unit and said second control shaft maintaining the normal operating speed so established by the actuation of said first control shaft free from the influence of load variations upon said driving unit.

2. In a driving unit for an endless conveyer chain having a stationary frame, a movable frame and driving means including a variable speed transmission carried by said movable frame, means to automatically control the normal operating speed of said driving unit and to correct said driving speed according to the load imposed upon said driving unit by said conveyer chain, said means comprising shifting levers connected to said transmission, a control shaft driven by said auxiliary motor, said control shaft having right and left hand threaded portions, a second control shaft mounted adjacent said first control shaft, said second shaft having splineways on portions corresponding to said right and left-hand threaded portions of said first control shaft, gearing interposed between said frames and connected to said second control shaft, members connecting said shifting levers to each of said control shafts, said members comprising right and left-hand threaded collars engaging the said right and left-hand threaded portions of said first control shaft respectively, yoke portions extending from said collars, said second control shaft extending through the outer part of said yoke portions, sleeves mounted on said second control shaft between said yoke portions, said sleeves being adapted to slide longitudinally of said second control shaft in said splineways thereon, the outer surfaces of said sleeves being provided with right and left-hand threads corresponding to the adjacent threaded portions of said first control shaft, similarly threaded collars engaging said sleeves, said shifting levers being affixed to said collars whereby the rotation of either of said control shafts will produce movement of said shifting levers axially of both of said control shafts independently.

JERVIS B. WEBB.
ANDREW G. ROSE.